(12) United States Patent
Seifert et al.

(10) Patent No.: US 9,292,615 B2
(45) Date of Patent: Mar. 22, 2016

(54) METHOD AND A SYSTEM FOR ANALYSING IMPACT OF CHANGES TO CONTENT OF A WEBSITE

(75) Inventors: Michael Seifert, Charlottenlund (DK); Jacob Hjort Christensen, Kastrup (DK); Lars Fløe Nielsen, København K (DK)

(73) Assignee: SITECORE A/S, København V (DK)

( * ) Notice: Subject to any disclaimer, the term of this patent is extended or adjusted under 35 U.S.C. 154(b) by 309 days.

(21) Appl. No.: 13/169,706

(22) Filed: Jun. 27, 2011

(65) Prior Publication Data
US 2012/0331128 A1   Dec. 27, 2012

(51) Int. Cl.
*G06F 17/30* (2006.01)
*G06F 11/34* (2006.01)

(52) U.S. Cl.
CPC ........... *G06F 17/3089* (2013.01); *G06F 11/34* (2013.01)

(58) Field of Classification Search
USPC ......................................................... 709/224
See application file for complete search history.

(56) References Cited

U.S. PATENT DOCUMENTS

| | | | |
|---|---|---|---|
| 6,981,037 B1 | 12/2005 | Srikant et al. | |
| 7,020,643 B2* | 3/2006 | Mah et al. | 706/46 |
| 7,373,594 B1* | 5/2008 | Lopez et al. | 715/229 |
| 2002/0042738 A1* | 4/2002 | Srinivasan et al. | 705/14 |
| 2006/0253345 A1* | 11/2006 | Heber | 705/27 |
| 2006/0271671 A1 | 11/2006 | Hansen | |
| 2008/0071773 A1* | 3/2008 | Gross | 707/5 |
| 2008/0275980 A1* | 11/2008 | Hansen | 709/224 |
| 2012/0116868 A1* | 5/2012 | Chin et al. | 705/14.43 |

FOREIGN PATENT DOCUMENTS

WO   WO 01/75678 A1   10/2001

* cited by examiner

*Primary Examiner* — Angela Nguyen
(74) *Attorney, Agent, or Firm* — Birch, Stewart, Kolasch & Birch, LLP

(57) ABSTRACT

A method and a system for managing a website are disclosed, the website being arranged on a server. According to the method, a website administrator initially performs changes to content of the website. Then the traffic to the website is analysed, including obtaining information regarding value generated for the website owner by the traffic, and the impact on the value generated for the website owner by the traffic, due to the performed changes, is evaluated. In the case that the evaluating step reveals that the performed changes decrease the value generated for the website owner by the traffic, a warning is generated for the website administrator. Thereby the website administrator is alerted if the changed content causes the value generated for the website owner by the visitors visiting the website to decrease, thereby allowing the website administrator to reverse the changes and/or perform further changes to the content in order to once again increase the generated value.

13 Claims, 5 Drawing Sheets

METHOD AND A SYSTEM FOR ANALYSING IMPACT OF CHANGES TO CONTENT OF A WEBSITE

FIELD OF THE INVENTION

The present invention relates to a method and a system for managing a website. More particularly, the present invention relates to a method and a system in which changes are performed to content of the website and the resulting impact on value generated for the website owner is evaluated.

BACKGROUND OF THE INVENTION

For website owners it is often desirable to investigate whether or not the traffic on the website generates value for the website owner, e.g. in terms of visitors to the website obtaining specific goals for the website owner, such as purchasing or ordering products or services, filling in a contact form, requesting a web based demo, ordering a catalogue, staying at the website for a specific time period, etc. It may also be desirable for a website owner to investigate how and to what extent changes performed on the content of the website affects the value generated for the website owner by the traffic.

US 2008/0275980 A1 discloses a method and system for testing variations of website content useful to optimize website visitor conversions. Test variations of website content are integrated with web analytics platforms so that website variations can be tracked and analyzed within web analytics reporting systems. A reverse proxy server is used to introduce page variations on existing website content. Thereby it is possible to test any number of website variations without the need to modify the existing web server.

DESCRIPTION OF THE INVENTION

It is an object of embodiments of the invention to provide a method for managing a website in which it is possible to analyse the impact of changes performed to content of the website to value generated for the website owner by traffic on the website, without the requirement of additional hardware and/or a proxy server.

It is a further object of embodiments of the invention to provide a method for managing a website which allows inexpedient changes to content of the website to be quickly detected, without the requirement of additional hardware.

It is an even further object of embodiments of the invention to provide a system for managing a website, the system allowing analysis of the impact of changes performed to content of the website to value generated for the website owner by traffic on the website, without the requirement of additional hardware.

According to a first aspect the invention provides a method for managing a website being arranged on a server, the method comprising the steps of:
- a website administrator performing changes to content of the website,
- analysing traffic to the website, including obtaining information regarding value generated for the website owner by the traffic,
- evaluating impact on the value generated for the website owner by the traffic, due to the performed changes, and
- generating a warning for the website administrator in the case that the evaluating step reveals that the performed changes decrease the value generated for the website owner by the traffic.

In the present context the term 'website' should be interpreted to mean a collection of related webpages, images, videos or other digital assets being addressed relative to a common Uniform Resource Locator (URL). The webpages of the website may advantageously be designed, presented and linked together to form a logical information resource and/or transaction initiation function. According to the first aspect of the invention, the website being managed is arranged on, or hosted on, a server. The server, and thereby the website, is typically accessible via a data network, such as the Internet or a Local Area Network (LAN). It should be noted that, in the present context, the term 'server' should be interpreted to cover a single device as well as two or more individual devices being interlinked in such a manner that they, to a visitor of the website, seem to act as a single device.

In the present context the term 'traffic on a website' should be interpreted to mean visitors visiting the website, navigating within the website and performing actions within the website.

According to the method of the first aspect of the invention, a website administrator initially performs changes to content of the website. In the present context the term 'content' should be interpreted to include anything which a visitor may experience during a visit to the website, including content presented to the visitor, such as web pages, images, video sequences, audible sequences, etc., actions performed by the visitor, including forms being filled in, searches performed within the website, tests, polls, etc., or any other kind of content which the visitor may experience or encounter during a visit to the website. Thus, when the website administrator performs changes to content of the website, this may very well affect how the visitors experience a visit to the website. This may, in turn, affect how the visitors behave, and consequently, the value generated for the website owner during a visit may be affected. Furthermore, changes to website content may affect the amount of traffic being directed to the website. This will be described in further detail below.

It should be noted that changes performed to content of the website may result in lower or higher value being generated for the website owner, or it may have no effect at all. It is desirable for the website owner to investigate whether or not changes to content have an effect, and if they do, whether this effect is positive or negative.

To this end the traffic to the website is analysed after the changes to content have been performed. The analysis includes obtaining information regarding value generated for the website owner by the traffic. This allows the website owner or administrator to investigate whether the generated value increases or decreases as a result of the performed changes to content.

Next, the impact on the value generated for the website owner by the traffic, due to the performed changes, is evaluated. Accordingly, it is investigated whether the performed changes results in increased, decreased or unchanged value being generated for the website owner.

Finally, a warning is generated for the website administrator in the case that the evaluating step reveals that the performed changes decrease the value generated for the website owner by the traffic. Accordingly, the website administrator is warned in the case that he or she performs changes to the website which result in visitor behaviour which decreases the value generated for the website owner. As a consequence, the website administrator will be able to quickly adjust the changes or reintroduce the previous content in order to avoid a continued decrease in value generated for the website owner.

In addition, a message may be generated for the website administrator, even if the value generated for the website owner is increased or unaffected by the performed changes. Such a message may inform the website administrator of this, and the website administrator may then use this information when performing further changes to content of the website.

A decrease in generated value may, e.g., be a result of a decrease in the amount of traffic being directed to the website. This may, e.g., be the case if the changes involve removal of words or phrases which turn out to be valuable search keys which previously generated traffic from search engines. This will be described in further detail below. Alternatively or additionally, a decrease in generated value may be a result of a change in behaviour by the visitors visiting the website. For instance, the performed changes may have the effect that visitors are no longer inclined to go to webpages which previously generated value for the website owner, e.g. webpages containing contact forms, purchase forms, etc. Or the content may have been changed in such a manner that it no longer appeals to a large number of visitors.

The step of performing changes to content of the website may include adding and/or removing at least one webpage of the website. According to this embodiment, complete webpages of the website may be added or removed. Alternatively or additionally, the performed changes may include adjusting content on existing webpages, e.g. rearranging elements within a webpage, adding or removing elements within a webpage and/or performing changes to existing elements, e.g. changes to appearance, changing text, etc.

The step of analysing traffic to the website may comprise the steps of:
  allowing a plurality of visitors to visit the website, and
  for each visit, monitoring navigations and/or actions performed by the visitor during the visit while accumulating value points in accordance with content viewed by the visitor and actions performed by the visitor, and in accordance with predefined value point settings associated with content of the website, thereby obtaining an accumulated value point score for the visit.

According to this embodiment, when the traffic to the website is analysed, a plurality of visitors is allowed to visit the website. For each visit the navigations and/or actions performed by the visitor during the visit are monitored, while accumulating value points. Value point settings have previously been associated with content of the website, and the value points of a given visit are accumulated in accordance with these settings, and in accordance with the navigations and/or actions performed by the visitor. Thus, when a visitor encounters a specific piece of content, the value points are adjusted with an amount corresponding to the value point setting associated with that piece of content.

Accordingly, at the end of a visit, an accumulated value point score has been obtained, which reflects the value point 'collected' by the visitor during the visit. If the value point settings are selected and assigned in an appropriate manner, the accumulated value point score may reflect the value which the visit generated to the website owner, i.e. it is a measure for how valuable the visit was.

Based on this, the impact on the value generated for the website owner by the traffic, due to the performed changes to the content of the website, is evaluated as described above.

The step of analysing traffic to the website may further comprise calculating efficiency of the traffic on the website, the efficiency being the sum of accumulated value point scores for all of the plurality of visits divided by the number of visits. Thus, the efficiency of the traffic provides a measure for the average generated value per visitor visiting the website. Thereby, according to this embodiment, the impact of the performed changes on the generated value is evaluated on the basis of how much value each visitor generated in average. Furthermore, according to this embodiment it is investigated how the performed changes affect the behaviour of visitors which actually visit the website, rather than how the performed changes affect the amount of traffic being directed to the website. If the efficiency decreases, it may be an indication that the changes performed to the content of the website renders the website less relevant to the visitors, and/or that the changed content does not encourage the visitors to exhibit a desired behaviour as much as the previous content. On the other hand, a decrease in efficiency may simply indicate that the amount of traffic to the website has increased significantly, and that the additional traffic generates less value for the website owner on an average basis than the existing traffic. In this case a decrease in efficiency is not necessarily 'bad news' for the website owner, since the total generated value may still have increased, due to the increased amount of traffic. If this is the case, the impact of the performed changes may, e.g., be evaluated by segmenting the traffic and comparing segmented traffic to the website prior to and after performing the changes to the content. For instance direct traffic prior to and after performing the changes may be compared, or traffic originating from a specific origin, or even traffic originating from a specific search engine and using specific search keys. The origins of the visits may, e.g., be weighted in order to allow comparisons of traffic prior to and after performing the changes to the content in a manner which allows the impact of the changes to be evaluated.

Alternatively or additionally, the impact may be evaluated on the basis of total value generated for the website owner, e.g. during a specific time window.

The step of evaluating may comprise obtaining information regarding value generated for the website owner prior to the step of performing changes to content of the website and after performing changes to the content of the website, and comparing the value generated prior to performing the changes to the value generated after performing the changes. The comparison provides a direct measure for the impact of the changes, since the situation prior to performing the changes is compared directly to the situation after performing the changes.

The step of evaluating may further comprise the step of performing a test after the step of performing changes to the content of the website. In this case the step of performing a test may comprise presenting original website content to a first set of visitors and changed website content to a second set of visitors, and the step of evaluating impact may comprise comparing analysis results originating from the first set of visitors to analysis results originating from the second set of visitors. Thereby, the analysis results originating from the first set of visitors represents value generated for the website owner before changes to the content are performed, and the analysis results originating from the second set of visitors represents value generated for the website owner after the changes are performed. Accordingly, the test reveals whether or not performing the changes to the content of the website decreases value generated for the website owner.

Alternatively or additionally, the step of evaluating may further comprise the steps of:
  prior to performing changes to the content of the website, allowing a plurality of visitors to visit the website,
  for each visit, registering a sequence of pages viewed by the visitor and/or actions performed by the visitor during the visit and accumulating a value point score reflecting value generated for the website owner during the visit, building path patterns based on the plurality of visits, where the registered sequences form the path patterns, and associating the accumulated value point scores with the path patterns, after performing changes to the content of the website, allowing a plurality of visitors to visit the website, for each visit, registering a sequence of pages viewed by the visitor and/or actions performed by the visitor during the visit and accumulating a value point score reflecting value generated for the website owner during the visit, building path patterns based on the plurality of visits, where the registered sequences form the path patterns, and associating the accumulated value point scores with the path patterns, and comparing the path patterns built prior to performing changes to the content of the website and the path patterns built after performing changes to the content of the website.

According to this embodiment, a plurality of visitors is initially allowed to visit the website before the changes are made to the content of the website. During each visit, a sequence of pages viewed by the visitor and/or actions performed by the visitor is registered. Thus, the registered sequence reflects the pages viewed by the visitor and the actions performed by the visitor during the visit, and the order in which they occurred. Accordingly, the registered sequence corresponds to the visitors 'path' through the website during the visit.

For each visit the navigations and/or actions performed by the visitor during the visit are monitored, while accumulating value points. Value point settings have previously been associated with content of the website, and the value points of a given visit are accumulated in accordance with these settings, and in accordance with the navigations and/or actions performed by the visitor. Thus, when a visitor encounters a specific piece of content, the value points are adjusted with an amount corresponding to the value point setting associated with that piece of content. Accordingly, at the end of a visit, an accumulated value point score has been obtained, which reflects the value points 'collected' by the visitor during the visit. If the value point settings are selected and assigned in an appropriate manner, the accumulated value point score may reflect the value which the visit generated to the website owner, i.e. it is a measure for how valuable the visit was.

Next, path patterns are built based on the plurality visits. The registered sequences originating from the plurality visits form the path patterns, and the accumulated value point scores are associated with the path patterns. Thus, the path patterns illustrate the navigations and actions performed by the plurality of visitors visiting the website before the changes to the content of the website are performed, during their visits to the website, as well as the value generated by the these visitors.

Similarly, after the changes to the content of the website have been performed, a plurality of visitors is once again allowed to visit the website. The procedure described above is repeated with respect to these visits. Thereby path patterns are obtained which illustrate the navigations and actions performed by the plurality of visitors visiting the website after the changes to the content of the website are performed, during their visits to the website, as well as the value generated by these visitors.

Finally, the path patterns built prior to performing the changes are compared to the path patterns built after performing the changes. This comparison reveals whether or not the value generated for the website owner by the visitors is altered due to the changes performed to the changes performed to the content of the website and, if this is the case, whether the value decreases or increases. Furthermore, the comparison of the path patterns may provide information regarding how the changes performed to the content of the website influence the behaviour of the visitors, since the path patterns represent the paths followed by the visitors during their visits. The comparison may, e.g., be performed on segmented traffic, for instance only direct traffic, traffic originating from specific origins or specific kinds of origins, etc., as described above.

The path patterns may form ordered tree data structures, where the pages and/or actions of the registered sequences form nodes of the ordered tree data structures. The ordered tree data structures may, e.g., each be in the form of a TRIE. According to this embodiment, one TRIE is built before the changes to the content of the website are performed, and another TRIE is built after the changes to the content of the website are performed, and the two TRIEs are then compared.

The step of generating a warning may comprise suggesting further changes to the content of the website. According to this embodiment, the website administrator is not only warned when it is revealed that the performed changes result in a decrease in value being generated for the website owner by the visitors visiting the website. The feedback from the system also suggests how to further change the content of the website in order to restore the previous level of value generated for the website owner, or even increase the value. The suggested changes may simply be a recommendation of rolling back the performed changes, i.e. reintroducing the previous content of the website. Alternatively or additionally, the suggested changes may include further changes to the content, beyond rolling back the previously performed changes.

The step of suggesting further changes may comprise suggesting changes to the structure of the website. This may, e.g., include changes to menus, such as changes to the order of menu points in order to arrange the most relevant and/or the most value generating menu points on top. This may be desirable, because visitors are more likely to select the menu point arranged on the top of the menu than a menu point arranged further down the list. Alternatively or additionally, suggested changes to the structure of the website may include deleting webpages, highlighting links, rearranging links, rearranging content within a webpage, etc.

The step of evaluating may comprise evaluating the amount of traffic on the website prior to performing changes to the content of the website and after performing changes to the content of the website. According to this embodiment, it is investigated how the performed changes to the content of the website affect the amount of traffic being directed to the website, rather than how the performed changes affect the behaviour of the visitors who actually access the website.

The step of evaluating may comprise reviewing the changes performed to the content of the website, and a warning may be generated in the case that the reviewing step reveals that the performed changes are likely to cause a decrease in traffic to the website. For instance, the changes to the content of the website may include changes to text appearing on the website. In this case the reviewing step may include investigating whether or not important keywords are removed. If it, for instance, turns out that a word has been removed which results in a high hit rate from one or more search engines, thereby resulting in a large amount of traffic being directed to the website, it is relevant to warn the website administrator. The warning allows the website owner to reintroduce the word, thereby avoiding the loss of traffic which would probably have been the result if the word had been removed. Other factors that may influence search engine referrals could include changes to the URL, the position of a keyword in the text, etc.

The method may further comprise the steps of evaluating the website in accordance with search engine algorithms prior to and after performing changes to content of the website. In this case the step of evaluating impact may comprise estimating search engine algorithm ranking of the website prior to and after performing changes to the content of the website, based on prior traffic to the website originating from search engines, and the step of generating a warning may comprise generating a warning in the case that the step of evaluating impact reveals that the estimated search engine algorithm ranking has decreased after the changes to the website content were performed.

According to this embodiment, the changes performed to the content of the website are investigated with respect to how they are expected to affect the amount of traffic directed to the website from the search engines. Accordingly, the website is evaluated from a search engine point of view, prior to and after performing the changes. Traffic originating from relevant search engines prior to performing the changes is analysed in order to determine the amount of traffic as well as why the traffic was directed to the website. Based on this it can be determined whether or not the changes to the content of the website are expected to affect the search engine algorithm ranking, and thereby the amount of traffic directed to the website from the search engines. A warning is generated if it appears that the changes are likely to decrease the search engine algorithm ranking, and thereby the amount of traffic originating from the search engines. Changes affecting the search engine algorithm ranking may, e.g., include removal of search keys or movement of search keys within the website, e.g. to a lower position. Accordingly, this part of the evaluation of the impact of the changes is not necessarily performed on the basis of the analysis of the traffic to the website after the changes have been performed.

The warning may, alternatively or additionally, be provided directly to a website editor performing the changes to the content of the website. In this case the method of the invention may be performed directly by an editorial tool used by the editor, i.e. a system performing the method may form part of the editorial system. Furthermore, the warning may be generated and displayed to the editor immediately when the editor attempts to implement the changes, such as when clicking a 'save' button. This may prevent the editor from, unintentionally, implementing changes which may potentially decrease the value generated for the website owner by traffic to the website.

According to a second aspect the invention provides a system for managing a website arranged on a server, the system comprising:
- a user interface allowing a website administrator to perform changes to content of the website,
- an analysis module adapted to analyse traffic to the website, said analysis module further being adapted to obtain information regarding value generated for the website owner by the traffic,
- an evaluating module adapted to evaluate impact on the value generated for the website owner by the traffic, due to changes performed to content of the website, and
- a warning generating module adapted to generate a warning for the website administrator in response to an output generated by the evaluating module.

It should be noted that a person skilled in the art would readily recognise that any feature described in combination with the first aspect of the invention could also be combined with the second aspect of the invention, and vice versa.

The system according to the second aspect of the invention may advantageously be used for performing the method according to the first aspect of the invention, and the remarks set forth above with reference to the first aspect of the invention are therefore equally applicable here. In particular, the system may form part of an editorial system used by a website editor editing the website. In this case a warning may be provided directly to the editor, as described above.

The system may be residing on the server having the website arranged thereon.

BRIEF DESCRIPTION OF THE DRAWINGS

The invention will now be described in further detail with reference to the accompanying drawings in which.

DETAILED DESCRIPTION OF THE DRAWINGS

Figure 1:
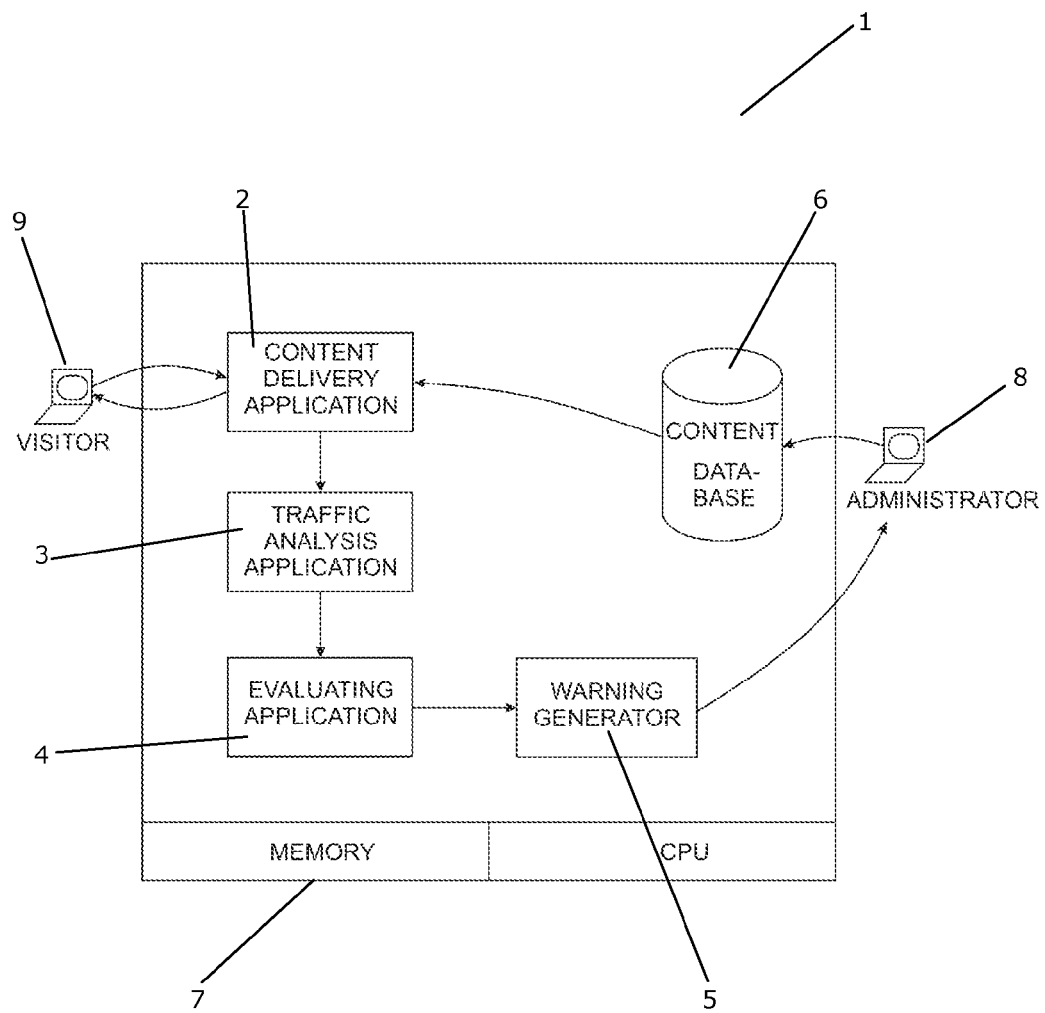
FIG. 1 is a diagrammatic view of a system according to an embodiment of the invention.

FIG. 1 is a diagrammatic view of a system 1 according to an embodiment of the invention. The system 1 is suited for being used for managing a website. The system 1 comprises a content delivery application 2, a traffic analysis application 3, an evaluating application 4, a warning generator 5 and a content database 6, all residing on a server 7. The server 7 could be a single device, or it could be two or more separate devices being interlinked in a manner which allows the separate devices to communicate in such a way that they act as a single device.

An administrator accesses the content database 6 via an administrator device 8, and performs changes to the content of the website. In FIG. 1 the administrator device 8 is illustrated as a personal computer (PC), but it should be noted that the administrator device 8 could alternatively be a cell phone, a tablet, a TV, or any other suitable kind of device allowing the administrator to access the content database 6. Subsequently, a visitor accesses the content of the website via a client device 9, and the content delivery application 2 delivers content to the client device 9 upon request from the visitor, thereby allowing the visitor to view desired content and/or perform desired actions within the website. The content is supplied to the content delivery application 2 by the content database 6, i.e. it is the content which was previously changed by the administrator. The client device 9 is also illustrated as a personal computer (PC), but could alternatively be a cell phone, a tablet, a TV, etc., as described above.

While the visitor navigates the website, the traffic analysing application 3 analyses the visit. During this, information is obtained regarding value generated for the website owner during the visit. This may, e.g., be performed by accumulating value points for the visit, the value points being accumulated in accordance with the content viewed by the visitor and/or actions performed by the visitor during the visit. In this case, the content of the website may previously have been associated with value point settings reflecting the value generated for the website owner when a visitor encounters specific content of the website. Thus, when a visitor views a specific piece of content or performs a specific action, value points corresponding to the viewed content or performed action are added to the value point score for the visit. Accordingly, when the visit is completed, a value point score for the visit has been obtained, and the value point score represents the value generated for the website owner during the visit.

Subsequently, the evaluating application 4 evaluates the impact on the value generated for the website owner by the visitor, due to the performed changes to the website content. This may, e.g., include comparing value generated during visits performed prior to performing the changes to value generated during visits performed after performing the changes.

In the case that it is revealed that the performed changes decrease the value generated for the website owner, the evaluating application 4 supplies this information to the warning generator 5. In response to this, the warning generator 5 generates a warning and supplies the warning to the administrator via the administrator device 8. In response to the warning, the administrator may perform further changes to the content of the website, e.g. reversing the previously performed changes, in order to once again increase the value generated for the website owner.

As an alternative, the evaluating application 4 may supply information to the warning generator 5, regardless of whether the value for the website owner is increased or decreased due to the performed changes. In this case, if it is revealed that the value for the website owner is increased due to the performed changes, the warning generator 5 generates a message for the administrator regarding this. Thereby the administrator knows that the performed changes have had a positive effect on the value generated for the website owner. In response to this, the administrator may attempt to perform further similar changes to the content of the website in order to further increase the value generated for the website owner.

Figure 2:
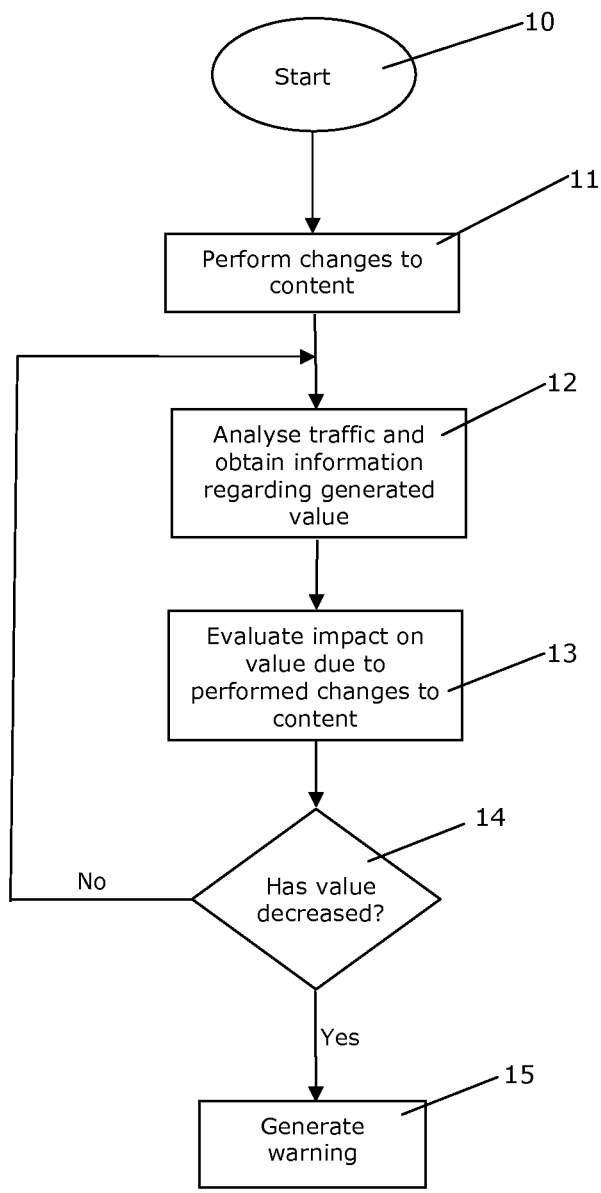
FIG. 2 is a flow diagram illustrating a method according to a first embodiment of the invention.

FIG. 2 is a flow diagram illustrating a method according to a first embodiment of the invention. The process is started at step 10. At step 11 a website administrator performs changes to the content of a website. The changes may, e.g., include adding and/or removing text, pictures, links, menu points, polls, forms, social media, buttons, etc. Alternatively or additionally the changes may include rearranging components within a webpage and/or adding and/or removing entire webpages and/or any other suitable kind of changes to the content.

At step 12 the traffic to the website is analysed. This includes obtaining information regarding value generated for the website owner by the traffic. This may, e.g., be done by monitoring the behaviour of each visitor visiting the website, while accumulating value points in accordance with content viewed by the visitor and actions performed by the visitor, and in accordance with predefined value point settings associated with content of the website. The value point settings may, in this case, have been assigned to the content previously, e.g. when the content was created, by the website owner or manager. The value point settings are selected in such a manner that they reflect value generated for the website owner when a visitor views specific content or performs specific actions. When a visitor visits the website, a value point score is accumulated by continuously adding values defined by the value point settings. Thus, when a visitor views a specific piece of content or performs a specific action, the value point setting associated with that specific piece of content or action is added to the value point score of the visit. When the visit is completed, an accumulated value point score has been generated, and the accumulated value point score reflects the total value generated for the website owner during the visit. Alternatively, the information regarding value generated for the website owner by the traffic may be obtained in any other suitable manner.

At step 13 the impact on the value generated for the website owner, due to the performed changes to the content, is evaluated. This will reveal whether or not the performed changes to the content are beneficial to the website owner.

At step 14 it is investigated whether or not the value generated for the website owner has decreased as a result of the performed changes to the content. This is done on the basis of the evaluation performed at step 13. In the case that step 14 reveals that the generated value has not decreased, the process is returned to step 12 for further analysis of the traffic to the website. As an alternative, the process could be returned to step 11, in which case the website administrator will perform further changes to the content of the website, and the impact of these changes will then be analysed and evaluated in the manner described above. In any event, a message may be generated for the website administrator, informing the website administrator that the generated value was increased or unaffected as a result of the performed changes to the content, prior to returning the process to step 11 or 12. Such a message may guide the website administrator regarding future changes to be performed to the content of the website.

In the case that step 14 reveals that the value generated for the website owner by the traffic has decreased as a result of the changes performed to the content of the website, a warning is generated for the website administrator at step 15. Thereby the website administrator will be aware that the performed changes are decreasing the value generated for the website owner, and the administrator is therefore prompted to perform further changes to the content and/or to reverse the previously performed changes in order to once again increase the value generated for the website owner by the traffic to the website. Accordingly, the process may advantageously be returned to step 11 after the warning has been generated at step 15.

Figure 3:
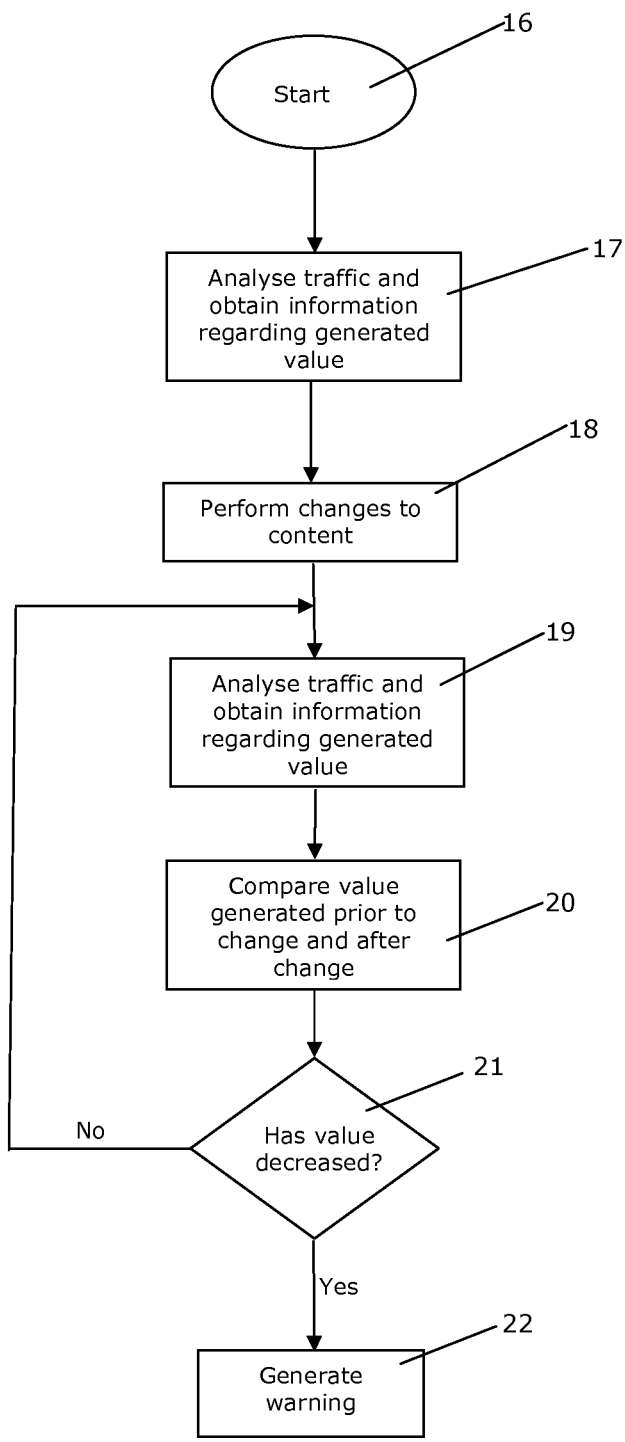
FIG. 3 is a flow diagram illustrating a method according to a second embodiment of the invention.

FIG. 3 is a flow diagram illustrating a method according to a second embodiment of the invention. The method illustrated in FIG. 3 is very similar to the method illustrated in FIG. 2. The process is started at step 16. At step 17 the traffic to the website is analysed, including obtaining information regarding value generated for the website owner by the traffic. This may, e.g., be done in the manner described above with reference to step 12 of the method of FIG. 2.

At step 18 a website administrator performs changes to the content of the website, in the manner described above with reference to step 11 of FIG. 2. At step 19 the traffic to the website is once again analysed, thereby obtaining information regarding value generated for the website owner by the traffic. This may also be done in the manner described above with reference to step 12 of the method of FIG. 2. Thus, information regarding value generated for the website owner prior to performing the changes to the content of the website, as well as information regarding value generated for the website owner after performing the changes is obtained.

At step 20 the value generated for the website owner by traffic to the website prior to performing the changes to the content of the website is compared to the value generated for the website owner by traffic to the website after performing the changes. Thus, the information obtained at step 17 is compared to the information obtained at step 19. This comparison provides information regarding the impact of the performed changes on the generated value.

At step 21 it is investigated whether or not the value generated for the website owner by the traffic to the website has decreased as a result of the performed changes to the content of the website. This is done on the basis of the comparison performed at step 20. In the case that step 21 reveals that the generated value is not decreased as a result of the performed changes, the process is returned to step 19, alternatively to step 18, as described above with reference to step 14 of FIG. 2. The remarks set forth above are equally applicable here.

In the case that step 22 reveals that the generated value has decreased, a warning is generated at step 22, in the manner described above with reference to step 15 of FIG. 2. The remarks set forth above are equally applicable here.

Figure 4:
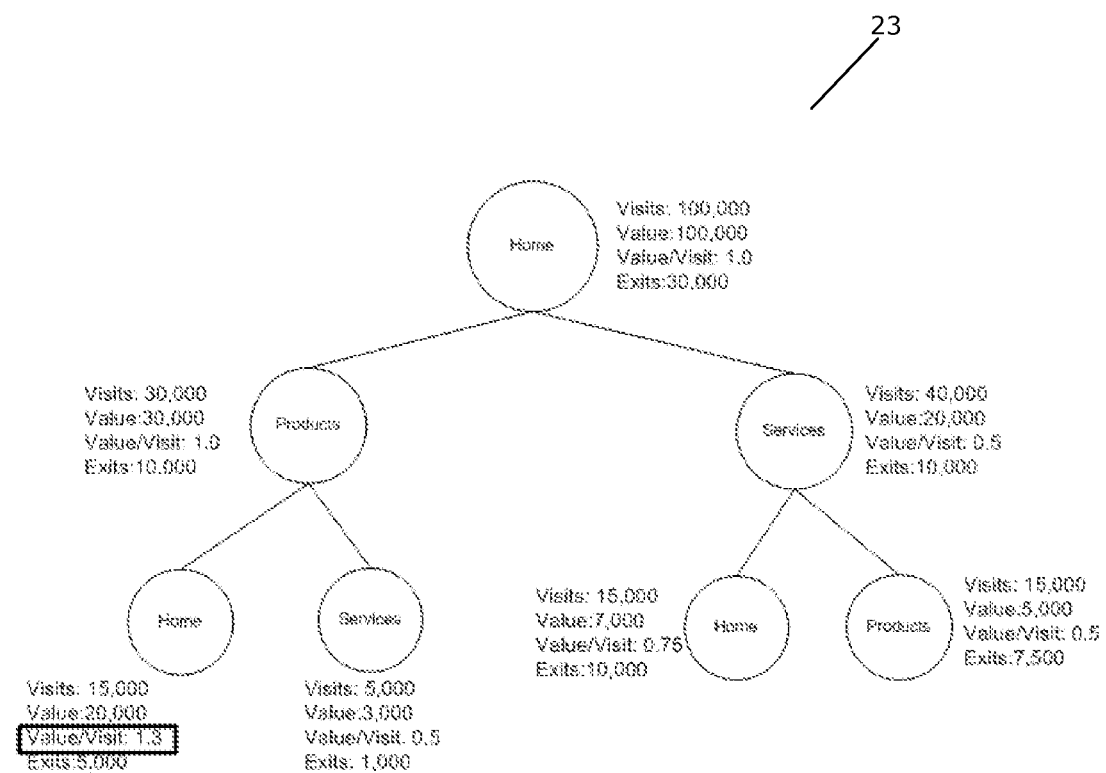
FIG. 4 is an ordered tree data structure, illustrating visitor behaviour and generated value prior to performing changes to content of a website.
Figure 5:
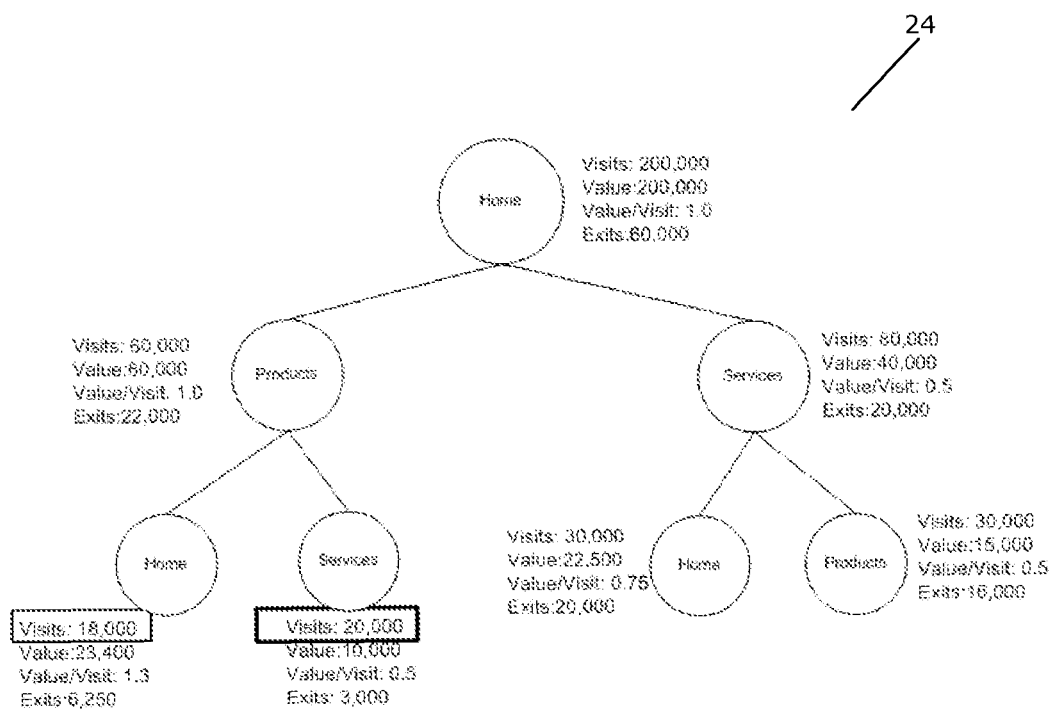
FIG. 5 is an ordered tree data structure, illustrating visitor behaviour and generated value after performing changes to content of a website.

FIGS. 4 and 5 show ordered tree data structures 23, 24, in the form of TRIEs, illustrating visitor behaviour, as well as value generated for the website owner during a plurality of visits to a website. The ordered tree data structures 23, 24 illustrate selected paths taken by a segment of visitors to the website. The website comprises three web pages, i.e. Home, Products and Services. Navigations to the webpages form nodes in the ordered tree data structures 23, 24. The ordered tree data 23 structure of FIG. 4 was built prior to a website administrator performing changes to the content of the website, and the ordered tree data structure 24 of FIG. 5 was built after these changes were performed.

All visitors entered the website via the Home page. Subsequently some visitors navigated to the Products page, some visitors navigated to the Services page, and some visitors exited the website. Of the visitors who navigated to the Products page, some navigated back to the Home page, some navigated further to the Services page, and some exited the website. Of the visitors who navigated to the Services page from the Home page, some navigated back to the Home page, some navigate further to the Products page, and some exited the website.

In FIG. 4 100,000 visitors have been allowed to visit the website, all entering the website via the Home page. The value generated by these visitors is 100,000 value points, corresponding to an efficiency, i.e. value per visit, of 1.0. 30,000 visitors exited the website directly from the Home page.

30,000 visitors navigated further on to the Products page. The value generated by these visitors is 30,000 value points, corresponding to an efficiency, i.e. value per visit, of 1.0. 10,000 visitors exited the website from the Products page.

15,000 visitors then navigated back to the Home page. The value generated by these visitors is 20,000 value points, corresponding to an efficiency, or value per visit, of 1.3. 5,000 visitors then exited the website.

5,000 visitors navigated further on to the Services page from the Products page. The value generated by these visitors is 3,000 value points, corresponding to an efficiency, or value per visit, of 0.5. 1,000 visitors then exited the website.

Of the 100,000 visitors who initially entered the website via the Home page, 40,000 navigated further on to the Services page. The value generated by these visitors is 20,000 value points, corresponding to an efficiency, or value per visit, of 0.5.

15,000 visitors then navigated back to the Home page. The value generated by these visitors is 7,000 value points, corresponding to an efficiency, or value per visit, of 0.75. 10,000 visitors then exited the website.

Finally, 15,000 visitors navigated further on to the Products page from the Services page. The value generated by these visitors is 5,000, corresponding to an efficiency, or value per visit, of 0.5. 7,500 visitors then exited the website.

Thus, the most efficient path followed by the visitors of the website is the path Home-Products-Home, while the least efficient paths are Home-Products-Services, Home-Services, and Home-Services-Products. It is therefore desirable that as many visitors as possible follow the path Home-Products-Home, and that as few visitors as possible follow the least efficient paths.

After the 100,000 visitors had visited the website and the ordered tree data structure of FIG. 4 had been built, a website administrator performed changes to the content of the Products page. Then 100,000 further visitors were allowed to visit the website, and this traffic was analysed. Based on the analysis, the ordered tree data structure 24 of FIG. 5 was built. The numbers indicating number of visitors, generated value, efficiency and exits for each of the nodes of the ordered tree data structure 24 of FIG. 5 represent the initial 100,000 visits as well as the subsequent 100,000 visit, i.e. 200,000 visits in total.

Comparing the ordered tree data structure 23 of FIG. 4 and the ordered tree data structure 24 of FIG. 5, it is clear that the number of visitors following the most efficient path, i.e. the path Home-Products-Home, has decreased significantly after the changes to the contents of the Products page were performed, while the number of visitors following the path Home-Products-Services, which is one of the least efficient paths, has increased significantly. Accordingly, the changes caused visitors to be diverted away from the most efficient and valuable path towards less valuable paths. As a result, the total value generated for the website owner by the traffic to the website has decreased, due to the changes performed to the content of the Products page. More specifically, the loss corresponds to 0.8 value per visit or a potential of 16,600 value points.

Upon discovering this, a warning can be generated for the website administrator as described above.

The invention claimed is:

1. A method for managing a website being arranged on a server, the method comprising the steps of:

a website administrator performing changes to content of the website, said changes being performed directly in a content management system having access to the server having the website arranged thereon, analysing traffic to the website, including obtaining information regarding value generated for a website owner owning the website by the traffic, evaluating the website in accordance with search engine algorithms prior to and after performing changes to content of the website, evaluating impact on the value generated for the website owner by the traffic, due to the performed changes, including reviewing the changes performed to the content of the website and including estimating search engine algorithm ranking of the website prior to and after performing changes to the content of the website, based on prior traffic to the website originating from search engines, and generating a warning for the website administrator, including providing a suggestion of how to perform further changes to the content of the website, in the case that the evaluating step reveals that the performed changes decrease the value generated for the website owner by the traffic, and in the case that the reviewing step reveals that the performed changes are likely to cause a decrease in value generated for the website owner, due to the estimated search engine algorithm ranking having decreased after the changes to the website content were performed, wherein the steps of evaluating the impact and generating the warning are performed after the step of performing the changes to content of the website and before implementing the performed changes.

2. The method according to claim 1, wherein the step of performing changes to content of the website includes adding and/or removing at least one webpage of the website.

3. The method according to claim 1, wherein the step of analysing traffic to the website comprises the steps of:
allowing a plurality of visitors to visit the website, and
for each visit, monitoring navigations and/or actions performed by the visitor during the visit while accumulating value points in accordance with content viewed by the visitor and actions performed by the visitor, and in accordance with predefined value point settings associated with content of the website, thereby obtaining an accumulated value point score for the visit.

4. The method according to claim 1, wherein the step of evaluating comprises obtaining information regarding value generated for the website owner prior to the step of performing changes to content of the website and after performing changes to the content of the website, and comparing the value generated prior to performing the changes to the value generated after performing the changes.

5. The method according to claim 1, wherein the suggestion of how to perform further changes comprises a suggested change to the structure of the website.

6. The method according to claim 1, wherein the step of evaluating comprises evaluating the amount of traffic on the website prior to performing changes to the content of the website and after performing changes to the content of the website.

7. The method according to claim 1, wherein the suggestion of how to perform further changes includes a suggested change of at least one of
reintroducing the content of the website that is prior to the performed changes,
adding at least one new webpage to the website,
removing at least one existing webpage from the website, or
adjusting content on at least one existing webpage, which includes at least one of
rearranging at least one existing element within the at least one existing webpage,
adding at least one new element to the at least one existing webpage,
removing at least one existing element from the at least one existing webpage,
performing changes to appearance of at least one existing element, or
performing changes to text of at least one existing element.

8. The method according to claim 1, wherein the step of reviewing the changes performed to the content of the website comprises investigating whether or not search keys, resulting in a high hit rate from one or more search engines, have been removed or moved within the website.

9. The method according to claim 3, wherein the step of analysing traffic to the website further comprises calculating efficiency of the traffic on the website, the efficiency being the sum of accumulated value point scores for all of the plurality of visits divided by the number of visits.

10. The method according to claim 4, wherein the step of evaluating further comprises the step of performing a test after the step of performing changes to the content of the website.

11. The method according to claim 4, wherein the step of evaluating further comprises the steps of:
prior to performing changes to the content of the website, allowing a plurality of visitors to visit the website,
for each visit, registering a sequence of pages viewed by the visitor and/or actions performed by the visitor during the visit and accumulating a value point score reflecting value generated for the website owner during the visit,
building path patterns based on the plurality of visits, where the registered sequences form the path patterns, and associating the accumulated value point scores with the path patterns,
after performing changes to the content of the website, allowing a plurality of visitors to visit the website,
for each visit, registering a sequence of pages viewed by the visitor and/or actions performed by the visitor during the visit and accumulating a value point score reflecting value generated for the website owner during the visit,
building path patterns based on the plurality of visits, where the registered sequences form the path patterns, and associating the accumulated value point scores with the path patterns, and
comparing the path patterns built prior to performing changes to the content of the website and the path patterns built after performing changes to the content of the website.

12. The method according to claim 10, wherein the step of performing a test comprises presenting original website content to a first set of visitors and changed website content to a second set of visitors, and wherein the step of evaluating impact comprises comparing analysis results originating from the first set of visitors to analysis results originating from the second set of visitors.

13. The method according to claim 11, wherein the path patterns form ordered tree data structures, where the pages and/or actions of the registered sequences form nodes of the ordered tree data structures.

* * * * *